UNITED STATES PATENT OFFICE.

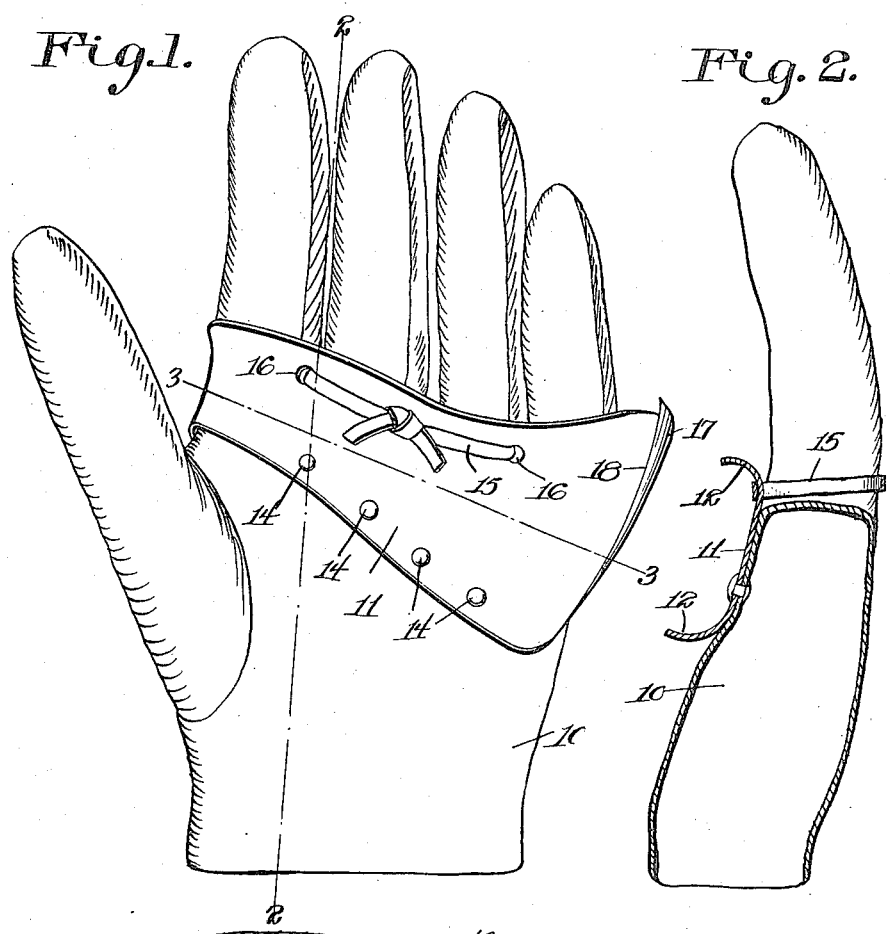

JOSEPH E. McWILLIAMS, OF HITCHCOCK, OKLAHOMA.

CORN-CUTTER.

1,173,291.

Specification of Letters Patent.

Patented Feb. 29, 1916.

Application filed October 31, 1913. Serial No. 798,556.

*To all whom it may concern:*

Be it known that I, JOSEPH E. MCWILLIAMS, a citizen of the United States, residing at Hitchcock, in the county of Blaine and State of Oklahoma, have invented certain new and useful Improvements in Corn-Cutters, of which the following is a specification.

This invention relates to an improved cutting attachment which is intended to be used in connection with a glove so that Kafir corn may be very easily harvested.

One of the principal objects of the invention is to so construct the attachment that it may be securely connected with the glove in the right position for cutting the corn.

Another object of the invention is to so form the attachment that it will be in the proper shape to grip the corn and cut the same.

Another object of the invention is to so construct the device that it will not be very easily torn loose from the glove.

Another object of the invention is to so construct the device that it may be formed from a single piece of material and thus very cheaply manufactured.

This invention is illustrated in the accompanying drawings wherein—

Figure 1 is a perspective view of a glove having the attachment in place; Fig. 2 is a sectional view along the line 2—2 of Fig. 1; Fig. 3 is a sectional view taken along the line 3—3 of Fig. 1.

The glove 10 shown in the drawing may be formed of any material desired such as leather or any suitable fabric. The plate 11 which is carried by the glove is preferably formed of sheet steel, but may be formed of any other material which may be tempered to provide a cutting edge. This plate is curved transversely as shown in Fig. 2 to provide the curved side walls 12 so that the plate will fit about the corn stalk and thus prevent the stalk from slipping off the plate during the cutting action. The plate has one end portion 13 bent to form a hook-shaped extension shown in Fig. 3 and extends over the edge of the hand between the thumb and the first finger to brace the plate and prevent the plate from being torn loose from the glove. This plate is secured to the glove by means of rivets 14, and if it were not for this extension 13, the rivets might be torn out of the glove after the device has been used for some time. It is, of course, obvious that any other desired securing means may be used in place of the rivets shown.

A lacing 15 is passed around the fingers as shown in Fig. 2 and after being passed through openings 16 in the plate, is tied as shown in Fig. 1, so that this side of the plate will be securely held to the fingers. This lacing securely holds the outer side portion of the plate in place but does not interfere with the movement of the fingers when cutting the corn. The end portion of the plate opposite the hook-shaped extension 13 is flared so that the portion of the corn which is to be cut may have a certain amount of transverse movement.

When using this device, a glove is placed upon each hand and the wearer walks along the row of corn and after grasping the stalks with his hands gives the proper motion to cause the cutting edges of the attachment to cut through the corn stalks. The cut stalks will be held in his arms until he has gathered a sufficient quantity and these stalks are then placed in a pile so that they can dry. It is, of course, obvious that if desired they can be immediately placed in a wagon or receptacle and carried to a suitable storage place. It is also obvious that if desired, one glove may be used and the stalks all cut with the one hand upon which the glove is placed. It is more desirable, however, to provide two gloves so that the stalks can be cut with both hands.

What is claimed is:

A cutting device of the character described formed from a sheet metal blank having a rear edge and a forward edge of greater length than the rear edge to provide a forwardly and outwardly extending portion having a cutting edge, the extended portion being gradually curled from the rear edge portion of the blank to the forward edge thereof to provide a pronounced lateral extension on the forward portion.

In testimony whereof I affix my signature in presence of two witnesses.

JOSEPH E. McWILLIAMS.

Witnesses:
 JAMES B. SCOTT,
 OTTO E. WEITZ.

Copies of this patent may be obtained for five cents each, by addressing the "Commissioner of Patents, Washington, D. C."